(12) United States Patent
Borchardt

(10) Patent No.: US 7,415,793 B1
(45) Date of Patent: Aug. 26, 2008

(54) FISHING RIG

(76) Inventor: Terry Borchardt, 4217 NE. Tremont Cir., Lee's Summit, MO (US) 64064

( * ) Notice: Subject to any disclaimer, the term of this patent is extended or adjusted under 35 U.S.C. 154(b) by 0 days.

(21) Appl. No.: 11/716,573

(22) Filed: Mar. 12, 2007

(51) Int. Cl.
*A01K 85/00* (2006.01)

(52) U.S. Cl. ............... 43/42.36; 43/42.39; 43/42.24

(58) Field of Classification Search ............ 43/42.36, 43/42.39, 42.24, 42.05, 42.08, 42.49, 42.41, 43/34, 35, 37, 42.15
See application file for complete search history.

(56) References Cited

U.S. PATENT DOCUMENTS

| | | | | |
|---|---|---|---|---|
| 1,021,699 A | * | 3/1912 | Norlund | 43/35 |
| 1,173,694 A | * | 1/1916 | Witty | 43/35 |
| 1,694,697 A | * | 12/1928 | Beidatsch | 43/35 |
| 1,849,434 A | * | 3/1932 | Page | 43/42.02 |
| 1,994,878 A | * | 3/1935 | Smith et al. | 43/35 |
| 2,136,713 A | * | 11/1938 | Schnabel | 43/35 |
| 2,290,433 A | * | 7/1942 | Jeffers | 43/42.36 |
| 2,663,964 A | * | 12/1953 | Martin | 43/42.15 |
| 2,886,914 A | * | 5/1959 | Lievense | 43/42.39 |
| 2,900,753 A | * | 8/1959 | Park | 43/37 |
| 2,910,799 A | * | 11/1959 | Wentworth | 43/42.15 |
| 2,913,849 A | * | 11/1959 | Rolstone | 43/42.41 |
| 3,006,103 A | * | 10/1961 | Scott | 43/42.36 |
| 3,060,619 A | * | 10/1962 | Clifford | 43/35 |
| 3,147,564 A | * | 9/1964 | Messler | 43/35 |
| 3,411,233 A | * | 11/1968 | Hopper | 43/35 |
| 3,426,467 A | * | 2/1969 | Bryant | 43/42.36 |
| 3,497,985 A | * | 3/1970 | Joel | 43/35 |
| 3,543,430 A | * | 12/1970 | Brokaw | 43/42.05 |
| 3,665,634 A | * | 5/1972 | Baud | 43/35 |
| 3,724,117 A | * | 4/1973 | Flanagan, Jr. | 43/42.24 |
| 3,854,233 A | * | 12/1974 | Browning, III | 43/42.29 |
| 3,965,606 A | * | 6/1976 | Bingler | 43/42.39 |
| 3,990,171 A | * | 11/1976 | Davis | 43/42.4 |
| 4,020,583 A | * | 5/1977 | Gatlyn | 43/42.41 |
| 4,094,087 A | * | 6/1978 | Carpenter | 43/42.24 |
| 4,139,963 A | * | 2/1979 | Ingram | 43/42.36 |
| 4,167,076 A | * | 9/1979 | Weaver | 43/42.36 |
| 4,219,956 A | * | 9/1980 | Hedman | 43/42.39 |
| 4,367,607 A | * | 1/1983 | Hedman | 43/42.24 |
| 4,713,907 A | * | 12/1987 | Dudeck | 43/42.39 |
| 4,744,168 A | * | 5/1988 | McClellan | 43/42.36 |
| 4,782,618 A | * | 11/1988 | Rainey | 43/35 |
| 4,785,569 A | * | 11/1988 | Thomas, Jr. | 43/42.24 |
| 4,827,660 A | * | 5/1989 | Dudeck | 43/42.39 |
| 4,858,367 A | * | 8/1989 | Rabideau | 43/42.39 |
| 4,879,835 A | * | 11/1989 | Sprayberry | 43/42.39 |
| 4,926,578 A | * | 5/1990 | Morse et al. | 43/42.39 |
| 4,942,689 A | * | 7/1990 | Link et al. | 43/42.36 |
| 4,976,060 A | * | 12/1990 | Nienhuis | 43/42.41 |

(Continued)

FOREIGN PATENT DOCUMENTS

FR       2625867 A1 * 7/1989

(Continued)

*Primary Examiner*—Darren W Ark
(74) *Attorney, Agent, or Firm*—Charles M. Kaplan

(57) ABSTRACT

A fishing bait on a hook may be held in a chosen location by a sinker through which a fishing line passes. The fishing line is connected to the hook, and when fishing the line is pulled, the bait may twitch, enticing fish to strike the bait without moving away from the chosen location.

20 Claims, 5 Drawing Sheets

U.S. PATENT DOCUMENTS

| | | | |
|---|---|---|---|
| 5,010,679 A * | 4/1991 | Tischer | 43/35 |
| 5,025,586 A * | 6/1991 | Pixton | 43/42.36 |
| 5,092,073 A * | 3/1992 | Kaecker | 43/42.39 |
| 5,157,859 A * | 10/1992 | Wirkus | 43/42.39 |
| 5,175,955 A * | 1/1993 | Wilson et al. | 43/42.36 |
| 5,231,786 A * | 8/1993 | Hughes | 43/42.39 |
| 5,335,441 A * | 8/1994 | Blackwell | 43/42.36 |
| 5,353,540 A * | 10/1994 | Ward | 43/42.24 |
| 5,367,817 A * | 11/1994 | Clark | 43/42.36 |
| 5,394,636 A * | 3/1995 | Rabideau | 43/42.13 |
| 5,461,819 A * | 10/1995 | Shindledecker | 43/42.39 |
| 5,490,345 A * | 2/1996 | Infinger | 43/42.39 |
| 5,535,540 A * | 7/1996 | Crumrine | 43/42.36 |
| 5,588,247 A * | 12/1996 | Wicht | 43/42.31 |
| 5,625,975 A * | 5/1997 | Imes | 43/42.24 |
| 5,664,364 A * | 9/1997 | Clark | 43/43.16 |
| D384,725 S * | 10/1997 | Drury, Jr. | D22/126 |
| 5,829,183 A * | 11/1998 | Guerin | 43/42.36 |
| 5,832,655 A * | 11/1998 | Crumrine | 43/42.39 |
| 5,862,623 A * | 1/1999 | MacPherson | 43/42.24 |
| D405,863 S * | 2/1999 | Laney | D22/126 |
| 5,893,231 A * | 4/1999 | Kato | 43/42.24 |
| D412,732 S * | 8/1999 | Laney | D22/126 |
| D413,647 S * | 9/1999 | Laney | D22/126 |
| 6,138,399 A * | 10/2000 | Wilson | 43/42.24 |
| 6,266,916 B1 * | 7/2001 | Dugan | 43/42.39 |
| 6,546,663 B1 * | 4/2003 | Signitzer et al. | 43/42.36 |
| 6,571,508 B2 * | 6/2003 | Brinkman | 43/42.24 |
| 6,574,907 B1 * | 6/2003 | Mitton | 43/35 |
| 6,651,375 B2 * | 11/2003 | Parrish | 43/35 |
| 6,772,552 B2 * | 8/2004 | Parrish | 43/35 |
| 7,059,080 B2 * | 6/2006 | Bendel | 43/42.36 |
| 7,216,455 B2 * | 5/2007 | Becker | 43/42.39 |
| 7,234,267 B1 * | 6/2007 | Konstant | 43/42.36 |
| 7,254,916 B2 * | 8/2007 | Mussot | 43/35 |
| 2004/0261312 A1 * | 12/2004 | Ravencroft | 43/44.83 |

FOREIGN PATENT DOCUMENTS

| | | | |
|---|---|---|---|
| FR | 2759860 A1 * | 8/1998 | |
| JP | 08051893 A * | 2/1996 | |
| JP | 09107848 A * | 4/1997 | |
| JP | 2000139275 A * | 5/2000 | |
| JP | 2002112669 A * | 4/2002 | |
| JP | 2003250391 A * | 9/2003 | |
| JP | 2007295829 A * | 11/2007 | |

* cited by examiner

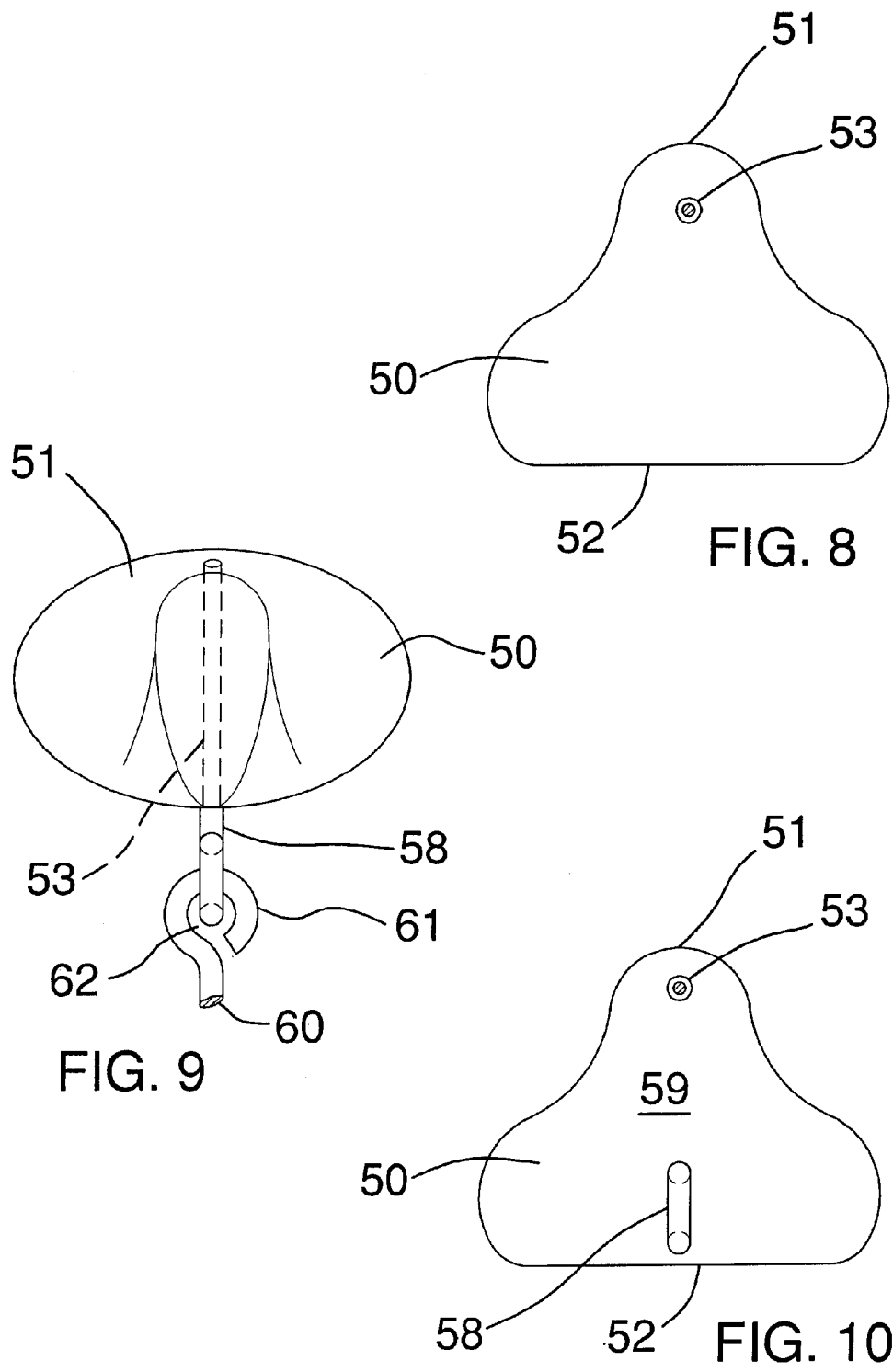

FISHING RIG

BACKGROUND OF THE INVENTION

This invention relates to fishing tackle and more particularly to artificial fishing lures.

Game fish are often territorial. They attack other creatures they perceive as a threat to their habitation, or to their control over a desired location. The territory a game fish defends might be a bed scooped into a lake or stream bottom, a rock or boulder, a log or other sunken object, a coral outcropping, or almost any prominent structural feature below the upper surface of a body of water.

Artificial fishing lures that appear to be moving past a territory being defended by a game fish will not always provoke a strike. Nor will game fish strikes consistently be provoked by fishing lures that are motionless when they are at rest because they may appear to be lifeless.

OBJECTIVES OF THE INVENTION

Accordingly, it is an object of this invention to provide improved fishing tackle.

An additional object is to provide jigs, soft bodied, and non-floating fishing lures with strike inducing action.

A further object is to provide fishing rigs with a sinker component that eliminates line twist.

Another object is to provide attachments for live and artificial baits that impart fish attracting motions to such baits.

Another object is to provide fishing rigs in which the fishhook stays point-up.

Another object is to provide fishing rigs that can produce strike provoking movements while the rigs stay put in a chosen location.

Another object is to provide twitchable fishing rigs that do not have to be advanced toward the person fishing them in order to produce game fish strike inducing movements.

Another object is to provide fishing rigs that catch more fish because fewer strikes are missed.

A further object is to provide fishing rigs that are rugged, economical, highly attractive, easy to use and change and adjust, and which do not possess defects found in similar prior art fishing rigs.

Other objects and advantages of the fishing tackle incorporating this invention will be found in the specification and claims and the scope of the invention will be set forth in the claims.

DESCRIPTION OF THE DRAWING

FIG. 8 is a front view of the sinker in the embodiment of FIG. 7.

FIG. 9 is a top view of the sinker in the embodiment of FIG. 7.

FIG. 10 is a rear view of the sinker in the embodiment of FIG. 7.

DESCRIPTION OF THE INVENTION

Figure 1:
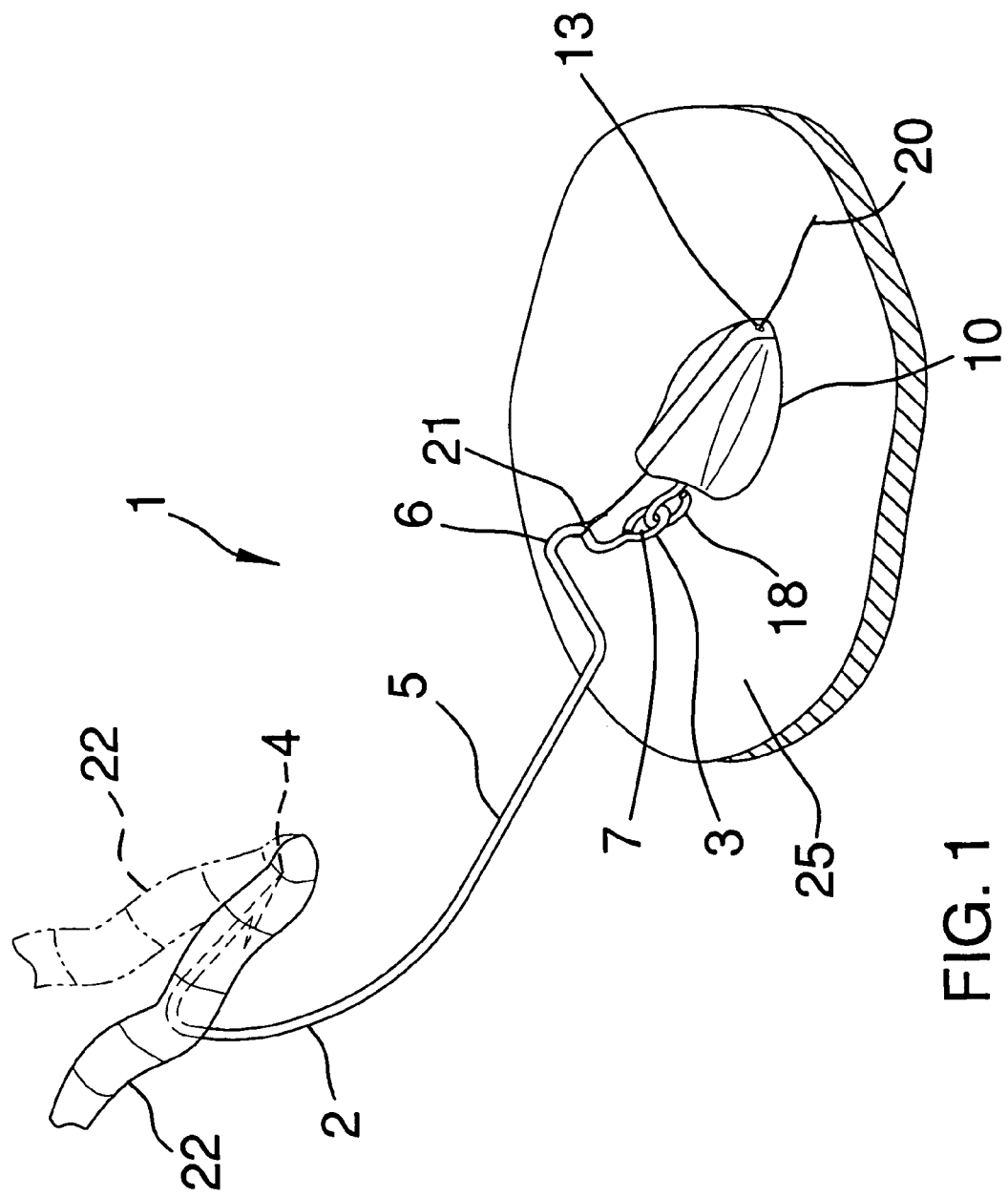
FIG. 1 is a partially broken-away, perspective view of an embodiment of a fishing rig in accord with this invention.

The drawing shows fishing rigs in accord with this invention. In embodiment 1, shown in FIGS. 1-4, a fishhook 2 has an eye 3, a sharp point 4 that extends in a direction generally toward the eye 3, which is also the general direction in which the rig 1 travels when retrieved by an angler. A hook shank 5 connects the eye 3 and point 4. A line-tie bend 6 in the shank 5 located between the point 4 and eye 3 may be closer to the eye than to the point. The opening 7 through hook eye 3 has a predetermined diameter. The point 4, shank 5 and line-tie bend 6 may all lie in essentially the same plane. The eye 3 may be in a plane that is essentially perpendicular to the plane of the point, shank and line-tie bend.

The rig of embodiment 1 includes a weight or sinker 10 having an uppermost surface 11 and a lowermost surface 12. An opening or bore 13 extends all the way through the sinker 10. The bore 13 is located below, but adjacent to, the uppermost surface 11. The uppermost surface 11 is defined as the outer surface of the sinker 10 that is located above the bore 13. The lowermost 12 surface is greater in area or larger than the uppermost surface 11. The lowermost surface 12 may be essentially flat.

A fishhook connector 15 has a first portion 16 that is embedded in the sinker 10 above lowermost surface 12 but below the bore 13. The portion 16 may be embedded closer to the lowermost surface 12 than to the uppermost surface 11. A nub or bend 14 at the end of portion 16 may be used to anchor the connector 15 in the sinker 10. A second portion 17 of the connector 15 may include an eyelet 18 that extends beyond the rear end 19 of sinker 10. Eyelet 18 may be in a plane that is essentially perpendicular to the flat lowermost surface 12 of sinker 10. Eyelet 18 is intertwined with hook eye 3 in that the diameter of the eyelet 18 is smaller than the diameter of the opening 7 through the hook eye 3.

A fishing line 20 extends through bore 13 and is freely movable therein. A terminal end 21 of line 20 is tied or otherwise attached in conventional manner to line-tie bend 6 of hook 2 behind sinker 10. The attachment of line end 21 to line-tie bend 6 may be above eyelet 18.

A fishing bait 22 is impaled on the hook 2. The bait 22 may be an artificial fishing lure, such as a plastic worm or aquatic creature. The bait 22 also may be natural food, such as a worm or minnow.

In FIG. 1 the numeral 25 identifies a location beneath the surface of a body of water being fished which a territorial game fish may choose to defend or control. The rig 1 may be moved and manipulated until the rig comes to rest on the location 25 being defended by a game fish. By gently tugging, or pulling, on line 20, fishing bait 22 can be made to move, or twitch, from a first position or location shown in full lines to a second position or location shown in phantom. Because of the manner in which hook 2 is connected to sinker 10, this lifelike, strike inducing motion can be imparted to the bait 22 without causing the sinker 10 to move off the location 25 a game fish is defending. This is further illustrated in FIG. 2 where pulling on the line 20 would move hook point 4 from the position shown in full lines to the position shown in phantom, and thereby would move bait impaled on the hook point closer to the sinker 10.

Figure 5:
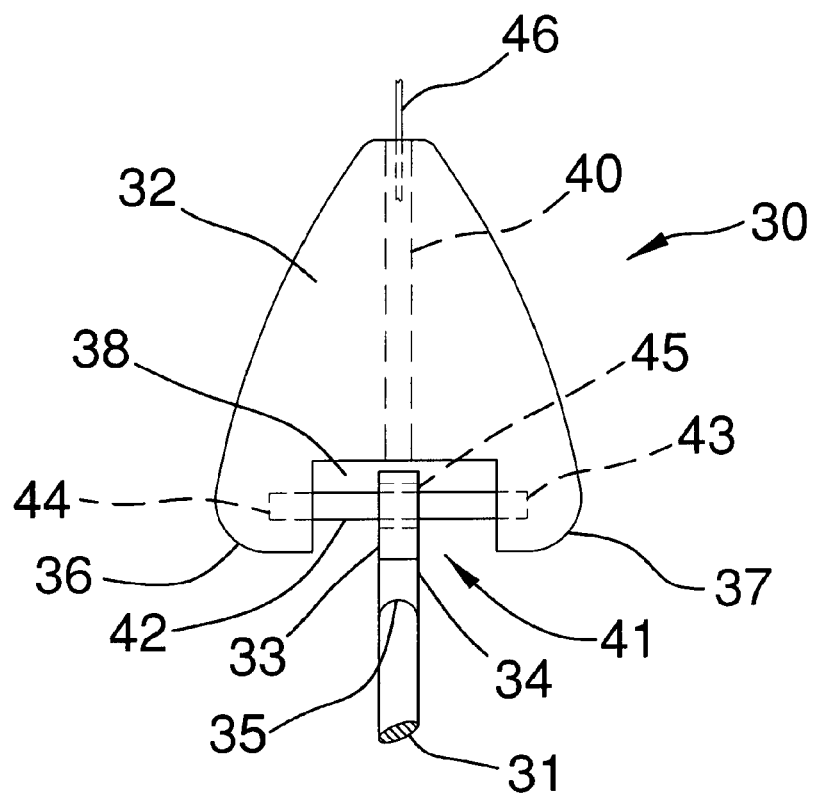
FIG. 5 is an enlarged broken-away top view of another embodiment of a fishing rig in accord with this invention.
Figure 6:
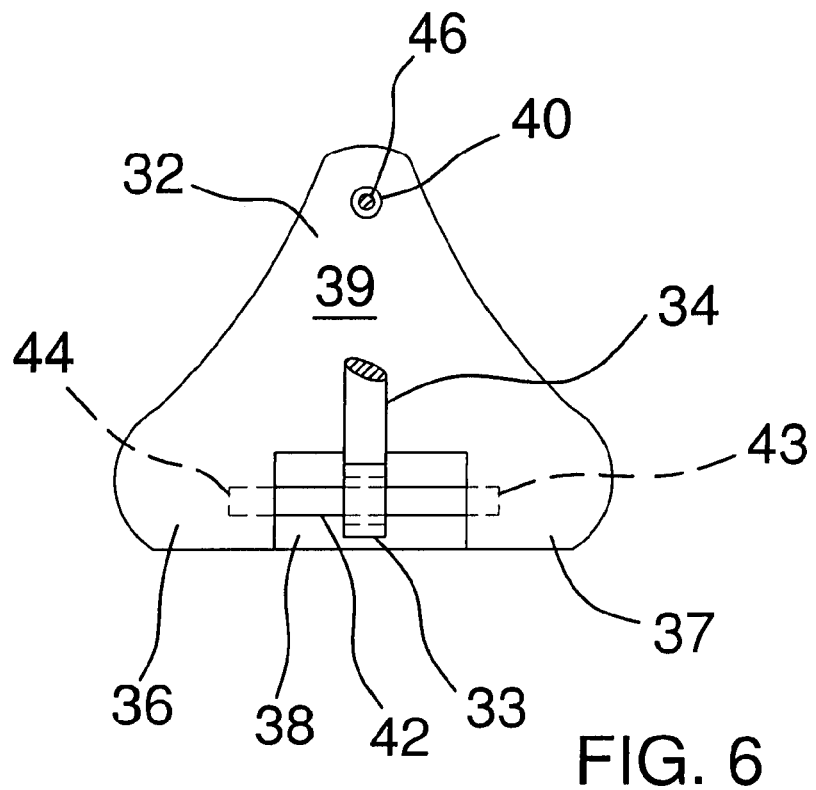
FIG. 6 is an enlarged broken-away rear view of the embodiment shown in FIG. 5.
Figure 7:
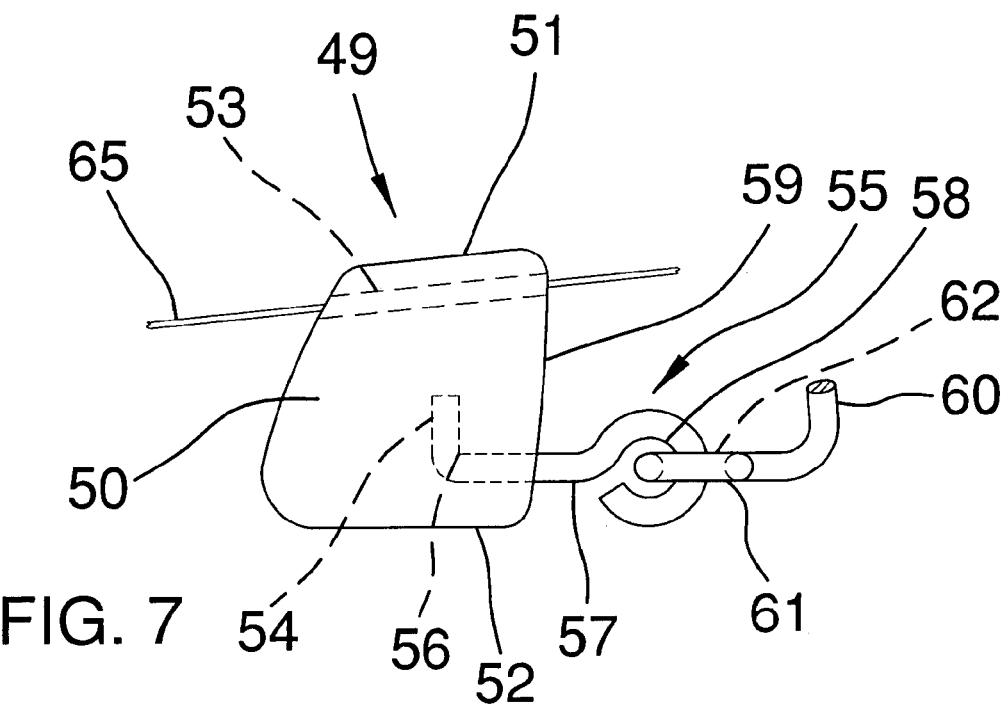
FIG. 7 is an enlarged, partial, broken-away side view of another embodiment of a fishing rig in accord with this invention.

FIGS. 5 and 6 illustrate another embodiment of the invention in the form of a fishing rig 30 that is identical to the fishing rig 1 of the FIGS. 1-4 embodiment, except for the means used to connect the hook 31 to the sinker 32 and the orientation of the hook eye 33. In this embodiment the hook point (not shown), shank 34 and line-tie bend 35 are all in essentially the same plane, as described above, and the hook eye 33 is also in that same plane. Bait is impaled on hook 31 in the same way as shown in the FIGS. 1-4 embodiment.

Arms 36 and 37 of sinker 32 define a notch 38 located adjacent the rear end 39 of the sinker and below the bore 40. A fishhook connector 41 comprises a cylindrical rod 42 that spans the notch 38. A first portion of the rod comprises its ends 43 and 44, which are embedded in arms 36 and 37. The opening 45 through hook eye 33 has a predetermined diameter. The diameter of rod 42 is less than the diameter of the opening 45, which enables the rod to pass through the hook eye and movably connect the hook 31 to sinker 32.

A fishing line 46 attached to the line-tie bend 35 will produce the same lifelike, strike inducing motions described above, when the line 46 is pulled or twitched, without requiring that the sinker 32 be moved from a location a game fish is defending.

Figure 2:
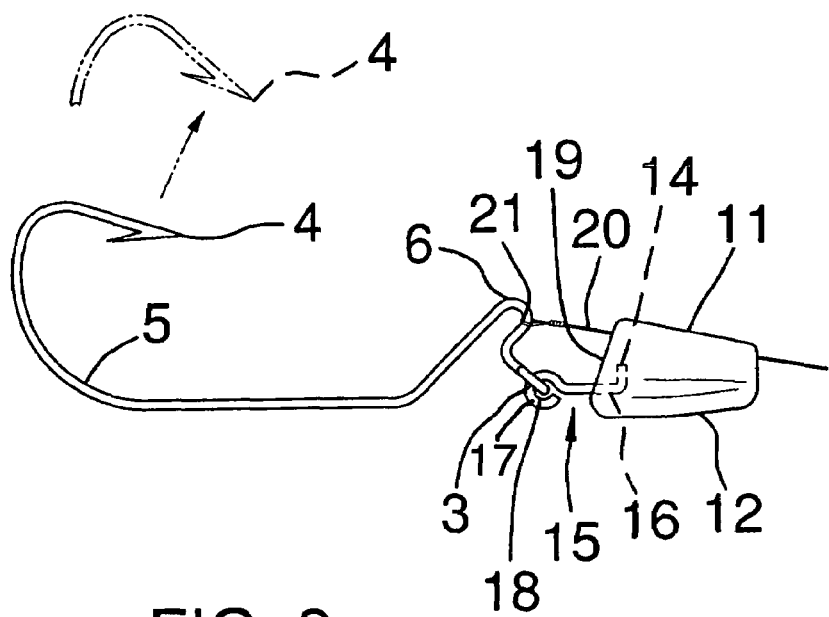
FIG. 2 is a side view of the fishing rig shown in FIG. 1.
Figure 3:
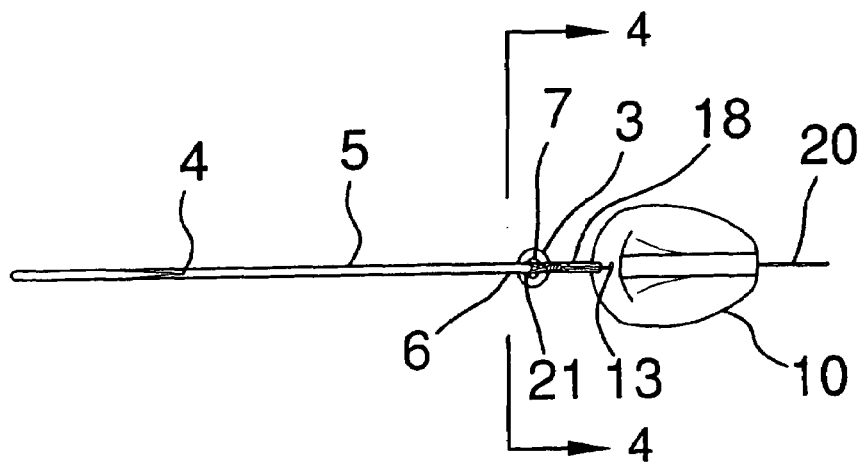
FIG. 3 is a top plan view of the fishing rig shown in FIG. 1.
Figure 4:
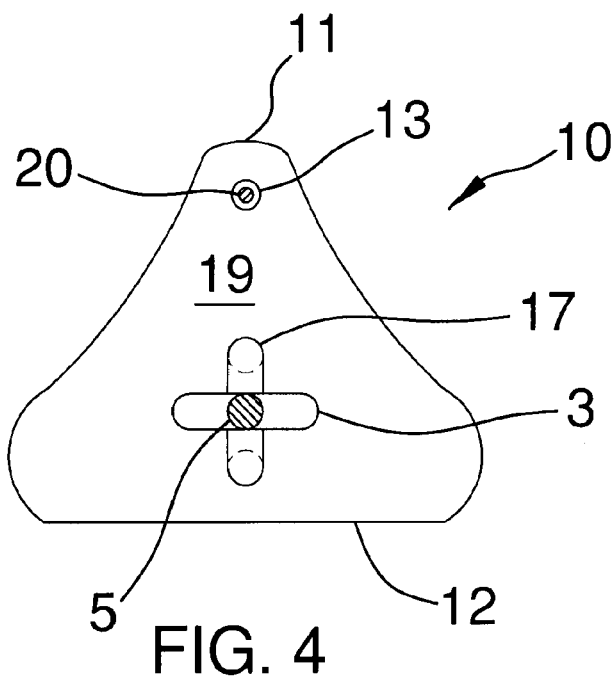
FIG. 4 is an enlarged cross sectional view taken along the line 4-4 in FIG. 3.

FIGS. 7-10 show another embodiment of a fishing rig 49 in accord with this invention that is identical to the embodiment of FIGS. 1-3, except that the shape of the sinker 50 is different in shape from the sinker 10. Sinker 50 an uppermost surface 51 and a lowermost surface 52. An opening or bore 53 extends all the way through the sinker 50. The bore 53 is located below, but adjacent to, the uppermost surface 51. The uppermost surface 51 is defined as the outer surface of the sinker 50 that is located above the bore 53. The lowermost 52 surface is greater in area or larger than the uppermost surface 51. The lowermost surface 52 may be essentially flat.

A fishhook connector 55 attaches to the sinker 50 a hook 60 that is identical to the hook 2. Connector 55 has a first portion 56 that is embedded in the sinker 50 above lowermost surface 52 but below the bore 53. The portion 56 may be embedded closer to the lowermost surface 52 than to the uppermost surface 51. A nub or bend 54 at the end of portion 56 may be used to anchor the connector 55 in the sinker 50. A second portion 57 of the connector 55 may include an eyelet 58 that extends beyond the rear end 59 of sinker 50. Eyelet 58 may be in a plane that is essentially perpendicular to the flat lowermost surface 52 of sinker 50. Eyelet 58 is intertwined with eye 61 of hook 66 in that the diameter of the eyelet 58 is smaller than the diameter of the opening 62 through the hook eye 61.

A fishing line 65 extends through bore 53 and is freely movable therein. A terminal end of line 65 may be tied or otherwise attached in conventional manner to a line-tie bend (not shown) in the manner depicting the tie to bend 6 in FIGS. 1-3. Attachment of the line 65 to hook 60 would be behind sinker 50, and attachment to the line-tie bend may be above eyelet 58.

A fishing bait impaled on the hook 60 will have the same lifelike, strike inducing motions described above, when the line 65 is pulled or twitched, without requiring that the sinker 50 be moved from a location a game fish is defending.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. A fishing rig comprising:
 a fishhook having an eye with an opening having a predetermined diameter, a sharp point extending in a direction generally toward said eye, a hook shank connecting said point and said eye, and a line-tie bend in said hook shank located between said point and said eye;
 a sinker having a bore extending therethrough;
 a fishhook connector having a first portion thereof embedded in said sinker, said connector having a second portion with a diameter smaller than said diameter of said opening in said eye of said fishhook, said second portion of said connector passing through said opening in said eye of said fishhook so as to movably attach said fishhook to said sinker;
 a fishing line passing freely through said bore in said sinker, one end of said fishing line being attached to said line-tie bend in said fishhook;
 a fishing bait impaled on said fishhook;
 whereby pulling on said fishing line causes said fishhook to change its position with respect to said sinker and thereby to change a location of said fishing bait with respect to said sinker.

2. The fishing rig defined in claim 1, further comprising: said second portion of said connector comprising an eyelet intertwined with said eye of said fishhook.

3. The fishing rig defined in claim 2, further comprising: said eyelet extending beyond a rear end of said sinker.

4. The fishing rig defined in claim 1, further comprising: said point, shank and line-tie bend of said fishhook being in essentially the same plane.

5. The fishing rig defined in claim 4, further comprising: said eye of said fishhook being in a plane essentially perpendicular to said plane of said point, shank and line-tie bend.

6. The fishing rig defined in claim 4, further comprising: said eye of said fishhook being in essentially the same plane as said point, shank and line-tie bend, said sinker having a notch adjacent its rear end, said notch being below said bore, said fishhook connector comprising a cylindrical rod spanning said notch and having its ends embedded in said sinker, and said rod passing through said eye of said fishhook.

7. The fishing rig defined in claim 1, further comprising: said sinker having a lowermost surface that is larger than its uppermost surface.

8. The fishing rig defined in claim 7, further comprising: said lowermost surface being generally flat.

9. The fishing rig defined in claim 8, further comprising: said second portion of said connector comprising an eyelet intertwined with said eye of said fishhook, and said eyelet being in a plane essentially perpendicular to said lowermost surface of said sinker.

10. The fishing rig defined in claim 1, further comprising: said second portion of said connector comprising an eyelet intertwined with said eye of said fishhook, said eyelet extending beyond a rear end of said sinker, said point, shank and line-tie bend of said fishhook being in essentially the same plane, said eye of said fishhook being in a plane essentially perpendicular to said plane of said point, shank and line-tie bend, said sinker having a generally flat lowermost surface that is larger than its uppermost surface, said eyelet being in a plane essentially perpendicular to said generally flat lowermost surface of said sinker, and said fishing line being attached to said line-tie bend above said eyelet.

11. A fishing rig comprising:
 a fishhook having an eye with an opening having a predetermined diameter, a sharp point extending in a direction generally toward said eye, a hook shank connecting said point and said eye, and a line-tie bend in said hook shank located between said point and said eye;
 a sinker having an uppermost surface and a lowermost surface, a bore extending through said sinker adjacent said uppermost surface, said lowermost surface being larger than said uppermost surface for holding said sinker at rest in a fixed location on a surface that is below an upper surface of a body of water being fished;

a fishhook connector having a first portion thereof embedded in said sinker above said lowermost surface of said sinker and below said bore, said connector having a second portion with a diameter smaller than said diameter of said opening in said eye of said fishhook, said second portion of said connector passing through said opening in said eye of said fishhook so as to movably attach said fishhook to said sinker;

a fishing line passing freely through said bore in said sinker, one end of said fishing line being attached to said line-tie bend in said shank of said fishhook;

a fishing bait impaled on said fishhook;

whereby pulling on said fishing line causes said fishhook to change its position with respect to said sinker and thereby to change a location of said fishing bait with respect to said sinker without changing said fixed location of said sinker.

12. The fishing rig defined in claim 11, further comprising: said second portion of said connector comprising an eyelet intertwined with said eye of said fishhook.

13. The fishing rig defined in claim 12, further comprising: said eyelet extending beyond a rear end of said sinker.

14. The fishing rig defined in claim 11, further comprising: said point, shank and line-tie bend of said fishhook being in essentially the same plane.

15. The fishing rig defined in claim 14 further comprising: said eye of said fishhook being in a plane essentially perpendicular to said plane of said point, shank and line-tie bend.

16. The fishing rig defined in claim 14, further comprising: said eye of said fishhook being in essentially the same plane as said point, shank and line-tie bend, said sinker having a notch adjacent its rear surface, said notch being below said bore, said fishhook connector comprising a cylindrical rod spanning said notch and having its ends imbedded in said sinker, and said rod passing through said eye of said fishhook.

17. The fishing rig defined in claim 11, further comprising: said lowermost surface of said sinker being generally flat.

18. The fishing rig defined in claim 11, further comprising: said second portion of said connector comprising an eyelet intertwined with said eye of said fishhook, and said eyelet being in a plane essentially perpendicular to said lowermost surface of said sinker.

19. The fishing rig defined in claim 11, further comprising: said second portion of said connector comprising an eyelet intertwined with said eye of said fishhook, said eyelet extending beyond a rear end of said sinker, said point, shank and line-tie bend of said fishhook being in essentially the same plane, said eye of said fishhook being in a plane essentially perpendicular to said plane of said point, shank and line-tie bend, said lowermost surface of said sinker being generally flat, said eyelet being in a plane essentially perpendicular to said generally flat lowermost surface of said sinker, and said fishing line being attached to said line-tie bend above said eyelet.

20. A fishing rig comprising:

a fishhook having an eye with an opening having a predetermined diameter, a sharp point extending in a direction generally toward said eye, a hook shank connecting said point and said eye, a line-tie bend in said hook shank located between said point and said eye, said line-tie bend being closer to said eye than to said point, said point, shank and line-tie bend of said fishhook being in essentially the same plane, and said eye of said fishhook being in a plane essentially perpendicular to said plane of said point, shank and line-tie bend;

a sinker having an uppermost surface and a generally flat lowermost surface, a bore extending through said sinker adjacent said uppermost surface, said lowermost surface being larger in area than said uppermost surface for holding said sinker at rest in a fixed location on a surface that is below an upper surface of a body of water being fished;

fishhook connector means having a first portion thereof embedded in said sinker above said lowermost surface of said sinker and below said bore, said first portion being embedded in said sinker closer to said lowermost surface than said uppermost surface, said connector means having a second portion with a diameter smaller than said diameter of said opening in said eye of said fishhook comprising an eyelet intertwined with said eye of said fishhook, said eyelet extending beyond a rear end of said sinker, and said eyelet being in a plane essentially perpendicular to said generally flat lowermost surface of said sinker;

a fishing line passing freely through said bore in said sinker, one end of said fishing line being attached behind said sinker to said line-tie bend in said shank of said fishhook above said eyelet;

a fishing bait impaled on said fishhook;

whereby pulling on said fishing line causes said point of said fishhook to move closer to said sinker and thereby to move said fishing bait closer to said sinker without changing said fixed location of said sinker.

\* \* \* \* \*